Aug. 29, 1961  G. A. KUNTZ ET AL  2,998,546
DISPLAY DEVICE
Filed Jan. 13, 1960  3 Sheets-Sheet 1
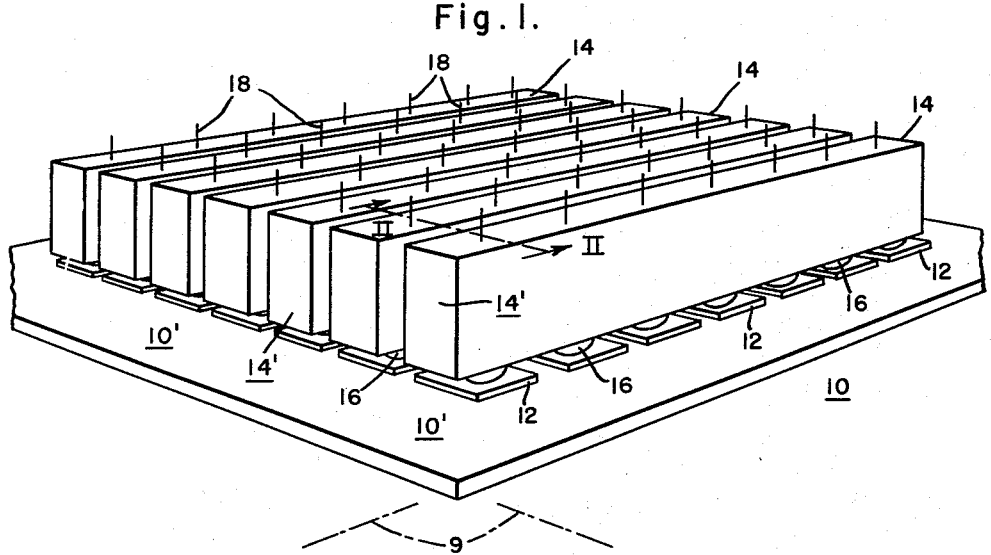
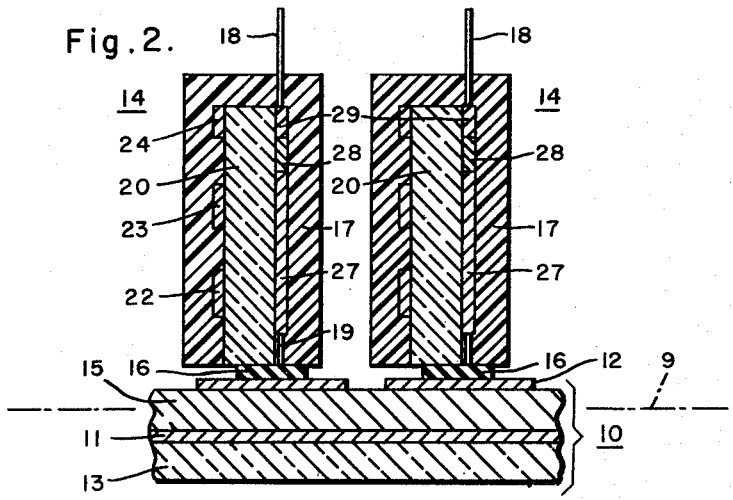
WITNESSES:
INVENTORS
George A. Kuntz and
George F. Gannon, Jr.
BY
ATTORNEY

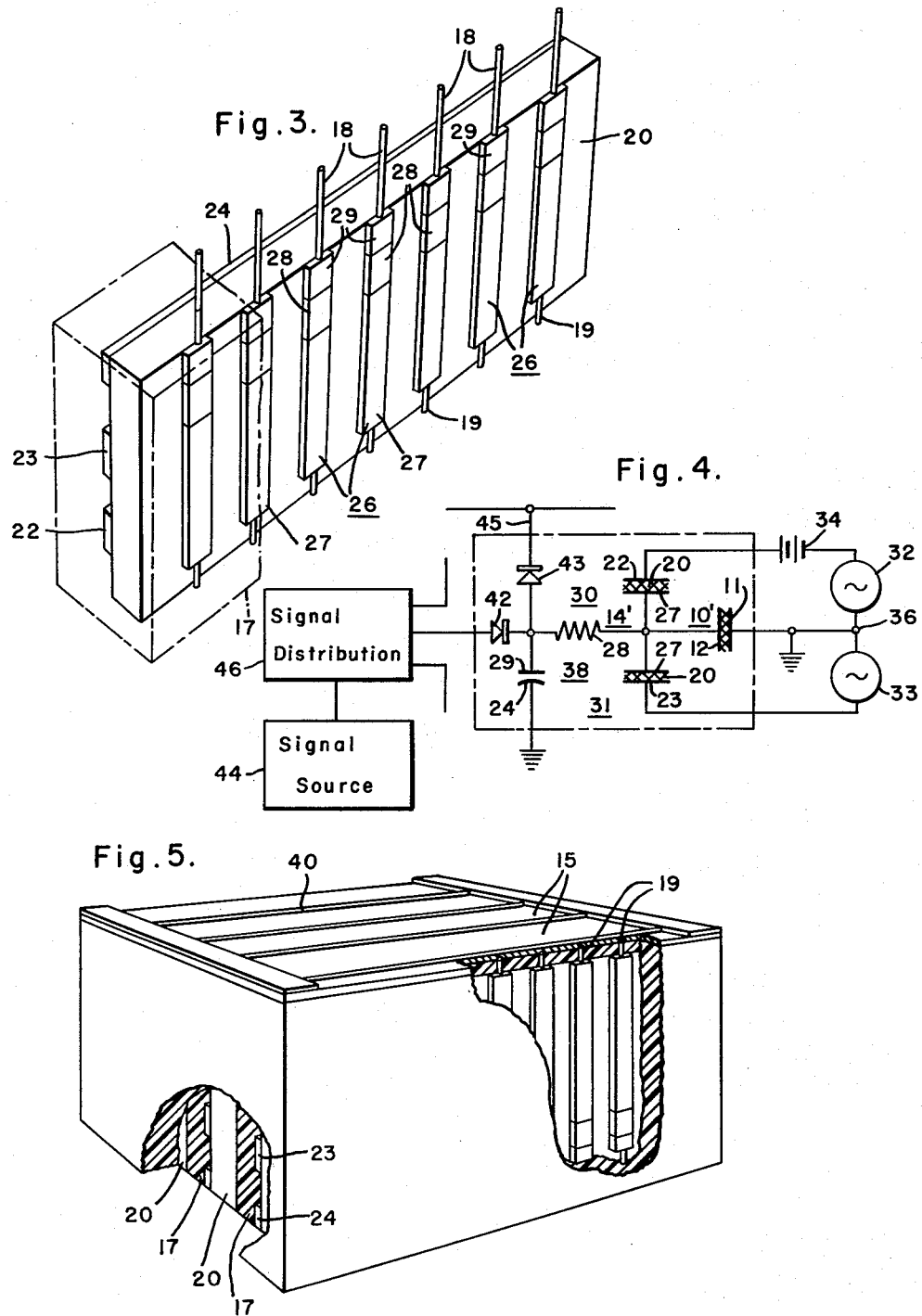

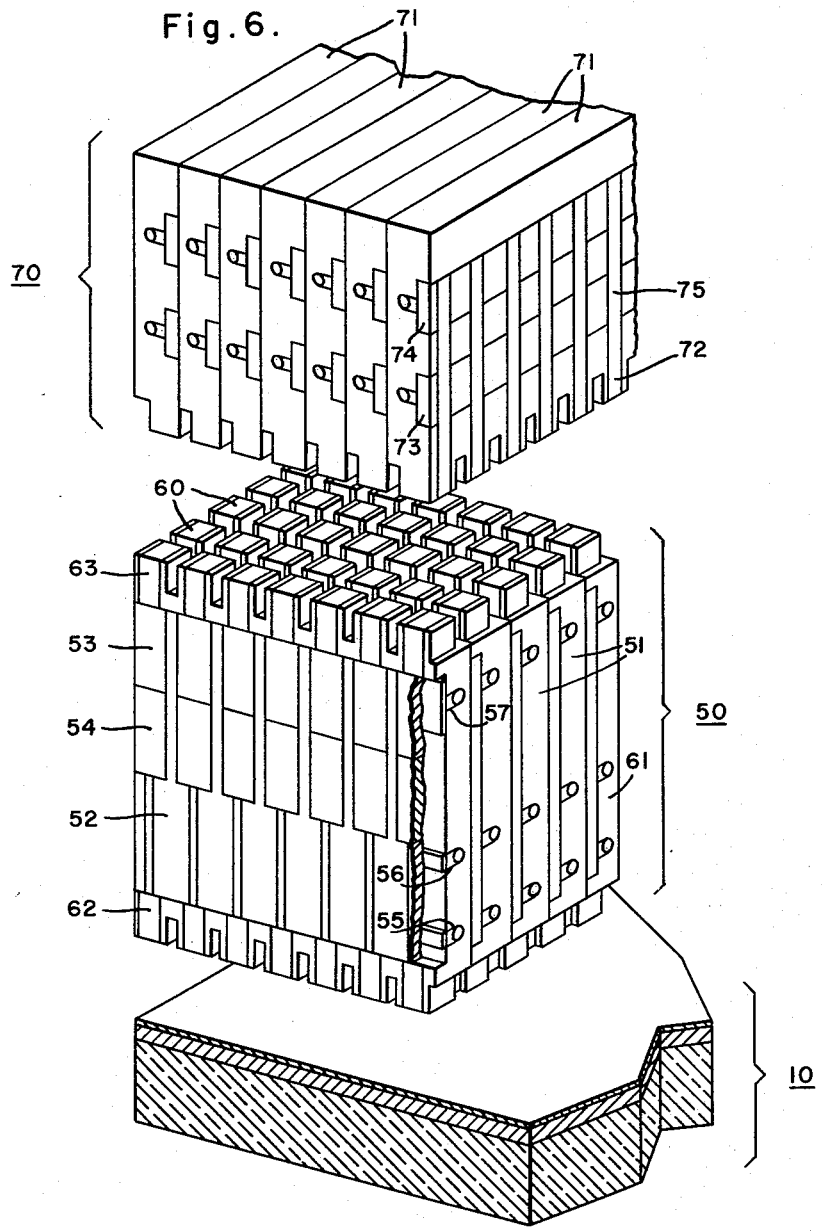

United States Patent Office 2,998,546
Patented Aug. 29, 1961

2,998,546
DISPLAY DEVICE
George A. Kuntz, East McKeesport, and George F. Gannon, Jr., Monroeville, Pa., assignors to Westinghouse Electric Corporation, East Pittsburgh, Pa., a corporation of Pennsylvania
Filed Jan. 13, 1960, Ser. No. 2,158
16 Claims. (Cl. 315—169)

This invention relates to display devices and, more particularly, to solid state display devices including a solid state light source.

It has been shown in Patent 2,917,667, issued December 15, 1959, filed December 14, 1956, entitled "Display Systems" by E. A. Sack, Jr. and assigned to the same assignee as the present invention, that there are several different circuit embodiments for achieving control of the light output of the individual elements of a display device. The display device is comprised of many light producing elements, such as a plurality of electroluminescent cells or a single electroluminescent phosphor member having a plurality of individually excitable elements. These circuit embodiments generally include a constant source or sources of a time varying voltage applied across the electroluminescent elements for excitation thereof. Also included are one or more nonlinear dielectric capacitors, associated with each electroluminescent element, whose effective impedance to the excitation voltage undergoes appreciable change upon the application of a direct current control potential. The impedance change varies the excitation potential drop across the electroluminescent element and, therefore, its light output. The nonlinear dielectric capacitor may comprise, for example, a member of the class of ferroelectric type materials, such as barium titanate or barium-strontium titanate, which have been shown to exhibit the referred to impedance change.

These display systems present several problems in construction. Since each screen element, in order to provide high resolution, must be small, the formation and interconnection of physically separate elements is prohibitive. One possible method of fabrication is set forth in the copending application Serial No. 730,669, filed April 24, 1958, entitled "Solid State Display Screens" by P. M. G. Toulon and assigned to the same assignee as the present invention, now Patent 2,938,135, issued May 24, 1960. According to the teachings of this copending application, the nonlinear dielectric capacitors are machined from a composite body formed of a sheet of nonlinear dielectric material sandwiched between sheets of conductive material. Conductive material remaining after the machining operation provides leads to external power sources. The same conductive material also serves as the plate or plates of nonlinear dielectric control capacitors. To produce such a structure requires a very delicate machining operation.

Another type of structure is that shown in copending application Serial No. 756,182, filed August 20, 1958, entitled "Display Device" by E. A. Sack, Jr. and J. A. Asars and assigned to the same assignee as the present invention, now Patent 2,922,076, issued January 19, 1960, in which the electroluminescent layer, the layer of nonlinear dielectric material and the necessary electrodes are fabricated in a laminated form. In these structures the electroluminescent layer has a continuous front electrode and elemental back electrodes forming many individual light-producing elements in a unitary structure. A single layer of nonlinear dielectric material, usually in ceramic form, having electrodes, bus bars and perhaps other components of a control and signal distribution scheme printed or otherwise deposited thereon, is placed in contact with the electroluminescent layer.

It has been found that the bridge circuit control configuration for the control of the light output of the electroluminescent cell is the most effective control means. That is, the brightness change which may be effected per unit control signal is highest of the known control configurations. The electrical operating characteristics of the bridge circuit control configuration are described more fully in previously mentioned copending application Serial No. 730,669. Such a control structure may be fabricated in laminated form in accordance with the teachings of copending application Serial No. 756,182, or according to certain improvements taught by copending applications Serial Nos. 854,075 and 854,077, filed November 19, 1959, entitled "Display Device" by P. N. Wolfe and assigned to the same assignee as the present invention.

In the laminated type structures just discussed, all of the electrodes comprising the control structure for a single light producing element must be deposited in an area on the nonlinear dielectric sheet which is equal, generally, to the area of the light-producing element. Some small space saving may be effected by utilizing some electrodes in the control structures of more than one element but to do so may promote interelement interaction and does not greatly alleviate the space problem. In addition, any portions of the signal distribution system, such as decoupling or storage elements, which are to be formed within the display device itself, must also be deposited within this same area. For a screen of reasonable resolution, this elemental area is of about 0.0039 square inch, determined by providing 16 elements per linear inch. Therefore, upon fabricating display screens having smaller and smaller light producing elements it is a necessary consequence to fabricate the control portion, and possibly part of the signal distribution system, in a correspondingly smaller and smaller area. While feasible means are known for fabricating such displays for many applications, as discussed in the beforementioned copending applications, these space limitations place an undesirable restriction upon element size making application to certain military and home entertainment displays a difficult problem.

Furthermore, while it may be possible to fabricate elements of the desired size in laminated form, another problem becomes so severe that no net gain in screen usefulness is achieved. The problem referred to is interelement interaction caused by the electrodes of adjacent elements being so close that the elements are no longer sufficiently electrically isolated to permit control of light output from sharply defined elements.

It is, therefore, an object of the present invention to provide a solid state display device having individually controllable light producing elements of small size.

Another object is to provide a solid state display device wherein space is available for the formation of control elements, which space is not limited by the resoluble element size of the device.

Another object is to provide a display device wherein interelement interaction may be substantially avoided.

Another object is to provide a display device wherein element size may be made quite small without imposing difficult fabrication problems.

In accordance with this invention a solid state display device is provided, departing from the conventional laminated form of device, comprising a plurality of nonlinear dielectric members having control electrodes, and possibly other circuit elements, disposed on the surfaces thereof. The nonlinear dielectric members are so arranged that the surfaces thereof extend in a nonparallel manner in relation to the viewing plane of the device, thereby providing ample space for control structures for individually controllable light producing elements with no appreciable interelement interaction. The light producing elements, on the projections thereof in the viewing plane, may have a very small area while not appreciably restricting the size of the control structures. The particular circuit incorporated in the control structures may be any one of those disclosed in the previously mentioned copending applications although the bridge circuit control structure is generally preferred.

The objects of this invention, and the manner in which they are achieved, will be more apparent from the following description, taken in accordance with the accompanying drawings, throughout which like reference characters indicate like parts, which drawing forms a part of this application and in which:

FIGURE 1 is a perspective view of a multi-elementary display device in accordance with the present invention;

FIG. 2 is a partial sectional view in elevation taken along the line II—II in FIG. 1;

FIG. 3 is a perspective view of a single unit of control structures in accordance with the present invention;

FIG. 4 is an equivalent circuit of a single element of a display device in accordance with the present invention;

FIG. 5 is a perspective view of an alternative embodiment of the present invention; and FIG. 6 is an exploded, perspective view of another embodiment of the present invention.

In FIG. 1 there is shown a solid state display device comprising an electroluminescent cell 10 including a plurality of elemental electrodes 12 on the back surface thereof. The elemental back electrodes 12 define a plurality of electroluminescent elements. It is not essential to the present invention to employ a unitary electroluminescent cell 10 but any arrangement of one or more cells may be used to provide an output image which appears to the viewer to be in a single viewing plane 9 and projections thereof. The electrode arrangement may also be modified so long as excitation may be supplied to the electroluminescent material. A plurality of encapsulated control structures 14, each having the necessary elements to control the light output of a row of electroluminescent elements, is disposed in parallel arrangement on the back surface of the electroluminescent cell 10. Each of the encapsulated control structures 14 is in electrical contact with a row of elemental back electrodes 12 by suitable means such as the conductive rubber discs 16, as shown. Electrically conductive leads 18 extend from the encapsulated control structures 14 for the application of control signals to individual elements thereof. For clarification in the following discussion each individual element of the electroluminescent cell 10 will be referred to as an electroluminescent element 10'; also, individual elements of the control structures 14 will each, whether encapsulated or not, be referred to as an elemental control structure 14'.

In FIGS. 2 and 3 there are shown details of a device in accordance with the present invention. The control structure comprises a sheet of nonlinear dielectrics material 20 extending across a row of light producing elements. Molded encapsulating material 17 encloses the fins 20 and the electrodes thereon. Upon each nonlinear dielectric sheet 20 there is disposed a pattern of electrodes. On a first side of the nonlinear dielectric sheet are disposed three parallel, electrically conductive strips 22, 23 and 24 which may extend across an entire row of light producing elements. To avoid confusion, the first and second parallel conductive strips 22 and 23 will be referred to as the first and second power input conductors, respectively. The third parallel conductive strip 24 will be referred to as the grounded capacitor plate.

Disposed on the second side of the nonlinear dielectric sheet 20 is a strip of material 26, one for each elemental control structure 14', having three different portions 27, 28 and 29, disposed directly on the nonlinear dielectric sheet 20. In addition, the conductive leads 18 and 19 are in contact with the opposite ends of each of the strips 26. A first conductive portion 27 of each strip 26 is disposed opposite the first and second power input conductors 23 and 24 on the first side of the nonlinear dielectric sheet 20. The first conductive portions 27 on the second side of the nonlinear dielectric sheet 20 will each be referred to as an elemental control electrode. Disposed in contact with each elemental control electrode 27 on the second side of the nonlinear dielectric sheet is a resistive element 28 which is also in contact with a second conductive portion 29 disposed opposite the grounded capacitor plate 24 on the first side. The second conductive portions 29 will each be referred to as a coupling capacitor plate.

Therefore, a single element of the multi-elementary screen shown in FIG. 1 comprises an electroluminescent element 10' from the back electrode 12 of which there extends a nonlinear dielectric body 20 having thereon an elemental control electrode 27, conductively coupled to the back electrode 12 of the electroluminescent element 10', opposite which are disposed two power input conductors 22 and 23 thereby forming two nonlinear dielectric capacitors. The elemental control electrode 27 is in direct contact with a resistive element 28 which in turn is in contact with a coupling capacitor plate 29 opposed by a grounded capacitor plate 24 on the opposite side of the nonlinear dielectric sheet 20. The coupling capacitor plate 29 serves as or is coupled to a signal receiving electrode 18.

More or less circuit elements may be disposed directly on the nonlinear dielectric members 20. For example, one highly useful embodiment comprises nonlinear dielectric members 20 having thereon only the elemental control electrode 27 and the two power input conductors 22 and 23. Which elements are included on a fin is determined by the electrical requirements, relative costs, ease of servicing and other considerations.

A better understanding of the structure shown in FIGS. 1, 2 and 3 will be had by referring to FIG. 4 which shows an electroluminescent element 10' in a bridge circuit control configuration. Each element of the display device, as shown enclosed in the dotted line of FIG. 4, comprises an electroluminescent element 10' having a grounded front electrode 11 and a back electrode 12 which is conductively coupled to two nonlinear dielectric control capacitors 30 and 31. In accordance with the present invention, a single conductive strip, namely the elemental control electrode 27, may comprise a plate of both nonlinear dielectric control capacitors 30 and 31. The opposite plates of the control capacitors 30 and 31 are provided by the power input conductors 22 and 23 which are coupled to potential sources 32 and 33 for the excitation of the electroluminescent element 10'. The excitation sources 32 and 33 are such as to provide across the electroluminescent element 10' a time varying electric field. Coupled in series with one or both of the excitation sources is a source of D.C. bias potential 34. The two excitation sources 32 and 33 have a common connection 36 which is at ground potential. It should be noted that the excitation sources 32 and 33 and the source of D.C. bias potential 34 need not be individually provided for each element but may supply a plurality of the elements in the display device. The components shown in FIG. 4 which are enclosed within the dotted line are employed in a single element of the device. The common plate 27 of the two control capacitors 30 and 31 is coupled to a decoupling resistor 28 which in turn is coupled to one plate 29 of a decoupling capacitor 38. The opposite plate 24 of the decoupling capacitor 38 is maintained at ground.

The structure shown in FIGS. 1, 2 and 3 and the circuit of FIG. 4 is exemplary of the manner in which the present invention provides nonlinear dielectric members or fins 20 extending from the back of an electroluminescent cell 10, on which fins 20 may be deposited many different circuit elements. One method of signal distribution to a screen such as that shown utilizes a pair of diodes for each element in the manner taught by copending application Serial No. 747,799, filed July 10, 1958, entitled "Signal Distribution System for Distributing Intelligence Signals From a Single Source to a Plurality of Utilization Channels" by F. T. Thompson and assigned to the same assignee as the present invention. According to this copending application, a pair of diodes 42 and 43 would be coupled to the common point of the decoupling resistor 28 and the decoupling capacitor 38. These diodes may be formed in strips on an extension of the nonlinear dielectric fins. A signal source 44 and a signal distribution system 46 are coupled to apply a control signal in the forward direction to a first diode 42. The second diode 43 is maintained in a generally nonconductive state by a bias applied to its lead 45. Explanation of the details and manner of operation of the described circuit may be had by referring to copending application 747,799.

It is of course not necessary that all the circuit elements confined to the fin type arrangement be disposed on a single continuous body of material. It has been found that fabrication is often simplified if a first group of fins, having certain elements disposed thereon, is mechanically and electrically coupled to a second group of fins having other elements. Embodiments of this invention subsequently disclosed in this application show how this idea may be applied.

In accordance with the teachings of the before-mentioned copending applications, particularly Serial No. 628,421, there are various schemes by which the light output of an electroluminescent cell may be controlled over elemental areas by the use of nonlinear dielectric capacitors. In general, this control is effected by the fact that the imposition of a control signal on a nonlinear dielectric capacitor causes it to change impedance to A.C. or other time varying potential. It has been found that the control may be most effectively accomplished by use of a bridge circuit configuration wherein, referring again to FIG. 4, the electroluminescent cell 10' is in the cross branch of the bridge circuit and nonlinear dielectric capacitors 30 and 31 are disposed in the outer branches each in series with a source of time varying potential 32 or 33 and, if found desirable to reduce the magnitude of the control signal necessary to effect a brightness change, a source of D.C. bias potential 34. The mode of operation may be such that when no control signal is applied the bridge is in balance and therefore no field is applied across the electroluminescent cell 10' and hence no light output is derived. The application of a control signal will result in an unbalancing of the bridge and the imposition of a field across the electroluminescent cell 10'. In this manner, the light output of this cell 10' can be made to increase with the application of an increasing control signal. The electrical operation of a device in accordance with the present invention is discussed in greater detail in the previously referred to copending applications. The bridge circuit configuration remains the preferred embodiment of the present invention but other circuit configurations may be employed.

The formation of a screen structure such as that shown in FIGS. 1, 2 and 3 may include the fabrication of a large area electroluminescent cell 10 of the conventional sort. For example, on a support member 13, which is necessarily light transmissive and may conveniently be of glass, may be deposited a layer 15 of an electroluminescent phosphor material fixed with a dielectric binder. This layer may comprise, for example, copper activated zinc sulfide in a binder of polyvinyl-chloride. The continuous front electrode 11 may be deposited upon the support member 13 and may be of tin oxide formed in a well-known manner. On the back surface of the electroluminescent layer 15, elemental electrodes 12 may be formed by evaporating a suitable conductive material, such as aluminum, through a mask.

The control structure comprises a fin 20 of nonlinear dielectric material. The nonlinear dielectric material may be, for example, selected from the group of materials known as ferroelectric materials, particularly those of the barium titanate type. This class includes, but is not liimted to, barium titanate, barium-strontium titanate, barium stannate, sodium columbate, sodium tantalate, potassium columbate and potassium tantalate. An example of a method of the preparation of such a material into a ceramic sheet suitable for use as the nonlinear dielectric fin 20 is discussed in an article in Bulletin of the American Ceramic Society for May, 1954, beginning on page 131, by Callahan and Murray.

A nonlinear dielectric material, for purposes of this invention, is a material wherein the time varying component of electric displacement is dependent upon the average value of an applied periodic electric field. Materials which may be termed linear dielectric materials, by reason of not coming within the preceding definition, are, therefore, those wherein the time varying component of electric displacement is independent of the average value of the applied time varying electric field. The significance of this distinction between nonlinear and linear dielectric materials is apparent from consideration of the operation of a device in accordance with the present invention and by reference to the previously mentioned copending applications.

The circuit elements, including the power input conductors 22 and 23, the grounded capacitor plate 24, the elemental control electrodes 27, the resistive elements 28 and the decoupling capacitor plates 29 may be sprayed through a photoetched mask, silk screened or printed with a suitable stamp. According to one suitable method for forming the conductive elements 22, 23, 24, 27 and 29, a paste comprising silver and a glass frit is sprayed on the nonlinear dielectric sheet 20 through a suitable mask in a pattern of the conductive elements and fried to form an adherent conductive coating.

The resistor 28 may then be formed by spraying and firing a coating of a suitable material such as a carbon material with a phenolic filler.

The completed nonlinear dielectric fin 14 is then encapsulated, one or more fins per encapsulation, in a suitable material 17 such as epoxy resin, nylon or low melting glass. Encapsulation is not a necessary feature of a device in accordance with this invention but it has been found desirable in many applications. For this purpose, the fin structure 14 is generally placed in a mold into which the encapsulating material is poured and set. A plurality of nonlinear dielectric fins 20 may be interconnected within a single encapsulation by wires connecting the respective power input conductors 22 and 23 of each fin 20. The extremities of only one pair of power input conductors 22 and 23 therefore need extend from the encapsulation. The leads 18 from the control structure 14 by which the input signal is applied may be formed by soldering to the coupling capacitor plates 29 fine wires 18 for each element or by encapsulating only to the height of the nonlinear dielectric fin 14 so that direct connection may be made to the coupling capacitor plate 29. Similarly, wires 19 may be attached to the elemental control electrodes 27 for connection to the back electrodes 12 of the electroluminescent cell 10. Conductive rubber discs 16 are shown in contact with the leads 19 from the elemental control electrodes 27 and also in contact with the back electrodes 12 of the electroluminescent cell 10. The conductive rubber discs may be made of a suitable material such as that sold under the trade name "Pliotherm" by the Goodyear Rubber Company. Good mechanical and electrical connection is made between these elements by employing a suitable conductive varnish. It has been found that the conductive rubber discs 16 are sufficiently resilient to even out rough spots on the electroluminescent cell 10 and nonlinear dielectric members 20. Alternatively, the elemental control electrode 27 may extend to the periphery of the encapsulated fin 14 and make direct contact to the back electrode 12 without the use of the conductive rubber discs 16.

The nonlinear dielectric members 20 are shown in the embodiment of FIGS. 1, 2 and 3 to extend substantially perpendicularly from the back surface of the electroluminescent cell 10. It is clearly not a necessity to dispose the fins 20 at any particular angle to the viewing plane 9 of the device. It is the utilization of the dimension perpendicular to the viewing plane 9 of the device, which in the embodiments shown is defined by the plane of the electroluminescent cell 10, which provides the primary advantages of the present invention. The fins 20 have surfaces whose dimension extending from the viewing plane 9 is about 5 or more times larger than the diameter of a single light producing element 10' or, more accurately, of the projection of a single light producing element 10' in the viewing plane 9. It may be desirable in some embodiments to dispose the fins 20 at an angle of less than 90° to the viewing plane 9. It will usually be found desirable that the angle between the fins 20 and the viewing plane 9 be between about 30° and 90°.

The drawings have been arranged for clarity in arrangement of the various components of a display screen in accordance with the present invention. The dimension of the nonlinear dielectric members 20 of FIGS 1, 2 and 3 extending away from the viewing plane 9 has been shown considerably shorter, relative to the diameter of one electroluminescent element 10', than it would probably be in actuality.

The nonlinear dielectric members 20 are shown to be long and rectangular and extending in a parallel manner over the elements of a row of the electroluminescent cell. Obviously, the nonlinear dielectric members 20 could be of an irregular shape if desired and may be confined to one or only a few elements.

In accordance with the previously described methods display devices have been made wherein the non-linear dielectric fins 20 have a width of about 0.5 inch, a thickness of about 5 mils and may be stacked in a display device up to more than 100 per inch. The power input conductors 22 and 23 are typically of a width of about 5 mils and are spaced apart about 40 mils. The elemental control electrodes 27 may also be of about 5 mils in width and may be spaced about 10 mils apart. The distribution of the elemental control electrodes 27, which is like that of the back electrodes 12 on the electroluminescent cell 10, determines, of course, the number of elements per inch of the display device.

The dimensions of the display device are determined to some extent by the potential levels which are applied to the various elements since the capacitance of the nonlinear dielectric control capacitors 30 and 31 and the coupling capacitor 38 are determined by the thickness of the nonlinear dielectric members 20 and the size of the conductive elements. The just previously mentioned dimensions are for a device wherein the signal voltage varies from about 0 to about 200 volts D.C. and the excitation sources each supply about 250 volts A.C. at 2000 cycles with a D.C. bias of about 300 volts D.C.

An alternate embodiment of the present invention is shown in FIG. 5. Here a plurality of control structures 14 comprising nonlinear dielectric sheets 20 having circuit elements disposed thereon are encapulated by a suitable material 17 into a single unit. The pattern and manner of forming the circuit components on the nonlinear dielectric sheets and the encapsulation may be as was described in connection with the embodiment of FIG. 1. To provide a clearer presentation of the invention, the direction of view taken in FIG. 5 is from the output side while that in FIG. 1 is from the control side of the display device. Conductive leads 19 extend through the surface of the encapsulating material 17. It may be desirable to supply additional conductive material thereon for larger surface area contact. For this purpose, a drop of silver or aluminum may be applied at the end of each conductive lead. From the opposite side of the encapsulated unit conductive leads by which signal or bias potential may be applied extend therefrom.

On the front surface of the encapsulated unit a pattern of back electrodes for the electroluminescent layer 15 are disposed in contact with the conductive leads 19 to the nonlinear dielectric sheets. On this electrode pattern there is then sprayed an electroluminescent phosphor and dielectric mixture 15 such as copper activated zinc sulfide in polyvinylchloride. It is then necessary to bake the electroluminescent material so as to set the plastic dielectric binder. For this purpose, heating to a temperature of about 100° C. for about 15 minutes has been found suitable. A front electrode 40 is then formed on the front surface of the electroluminescent layer 15. The type of material used for the front electrode 40 will depend to some extent upon the material in which the electroluminescent phosphor is embedded. For example, tin oxide may not be readily sprayed on an electroluminescent layer wherein the embedding material is plastic because of the high temperature required. However, where a glass embedding material is used, usually in the form of a glass frit which is subsequently fired to form a glazed surface, a conductive coating of tin oxide may be formed in the conventional manner. Where a plastic is used, however, one can evaporate a layer of gold or tin oxide thereon. Gold has relatively poor transmissivity and it is therefore undesirable to cover the entire surface of the electroluminescent layer 15 therewith. Therefore a viewing screen 40 is formed of fine, closely spaced lines which have been found to provide the necessary electrical properties for the display screen and still provide sufficient light output. Typically, the lines of the viewing screen may be of a thickness of about 2 or 3 mils and spaced from about 10 to about 12 mils to give 75% to 80% transmission.

It can be readily seen that a device in accordance with the present invention provides much greater space for the deposition of circuit elements on the nonlinear dielectric sheet 20 and enables the fabrication of display devices having a very small resolvable element size. Since the width of the elemental conductive strips 27 need not be great, the elements may be closely spaced. There is still space available to keep the elemental conductors 27 sufficiently apart to prevent interelemental interaction which would disturb the device's operation.

Considering display devices having the same resolvable element area of, say, sixteen per linear inch in the viewing plane, the import of the present invention is apparent. While in a laminated device a planar area of $\frac{1}{256}$ square inch is available, for fabrication of control circuit elements a comparable device according to the present invention provides a volume of $\frac{1}{256}$ square inch times the depth of the screen for the same purpose. No serious limitations are imposed on screen depth and it may readily be up to about one inch. The area available on the nonlinear dielectric member for the fabrication of circuit elements is considerably larger than the resolvable element size of the screen. While in display devices of the laminated type, the diameter of the light producing elements determined the surface area available on the nonlinear dielectric member available for the disposition of circuit elements comprising an elemental control structure, this is not the case since, in the practice of this invention the surfaces of the nonlinear dielectric members extend from the electroluminescent cell a distance considerably greater than the diameter.

A further advantage derived from a display screen in accordance with the present invention is that a single row, or a few rows, of control structures may be easily made in a single module and tested or replaced upon any failure in a completed device.

Another alternative embodiment of the present invention is shown in FIG. 6. In this embodiment, the electroluminescent cell 10 may be of the conventional form described in connection with FIG. 1. Disposed thereon is a control structure 50 comprising a plurality of fin structures 51 each having disposed thereon a pattern of conductive elements 52 and 53 between which is disposed a resistive element 54. This general arrangement is similar to that shown in FIG. 3. On the reverse side of each nonlinear dielectric fin 51 are disposed power input conductors 55 and 56 and grounded capacitor plate 57 also similar to that shown in FIG. 3. The individual nonlinear dielectric members 51 are each disposed within a holder of insulating material 60 each of which comprises a first portion 61 against which the nonlinear dielectric member 51 is disposed. Each of the holders 60 has end portions having a plurality of spaced teeth 62 and 63. One row of teeth 62 is disposed next to the electroluminescent cell 10 and the other row of teeth 63 is disposed at the extremity of the holder 63 opposite from the electroluminescent cell 10. The holder members 60 of insulating material may be of a suitable ceramic having a low dielectric constant. For this purpose, it has been found that the material sold under the trade name "Steatite" by American Lava Corp. is suitable. This material comprises an aluminum silicate mineral. It can be seen from the figure that the end portions 62 and 63 and the portion 61 therebetween are disposed so as to form a trough in which the nonlinear dielectric member 51 rests. Upon each of the teeth of the end portions 62 and 63 a conductive strip, formed in the same manner as those on the nonlinear dielectric member 51, extend over the surface parallel to the surface of the nonlinear dielectric member 51 and onto the end surface perpendicular thereto. In this manner, electrodes are formed at the end 62 to serve as the back electrodes on the electroluminescent cell 10 or to make contact to such electrodes. At the other end of the control structure 50, electrodes are formed for the application of control input signals.

A second structure 70 comprising a plurality of holders 71 of insulating material having an end portion 72 with a row of spaced teeth is disposed adjacent the control structure 50. Each tooth of the end portion 72 in this structure has a conductive strip 75 extending over the teeth making contact with the corresponding strips over the teeth on the control structure 50. In parallel slots on each of the holders 71 is disposed suitable semiconductive material for the formation of diodes 73 and 74 which serve the purpose of those shown in FIG. 4. The diodes are conductively coupled by the conductive strips 75.

Interlocking notches or grooves may be provided so that the control structure 50 and the diode structure 70 interconnect and are mechanically stable. The control structure 50 and the diode structure 70 are disposed so that the individual members thereof are mutally perpendicular for stability.

While the present invention has been shown in a few forms only, it will be obvious to those skilled in the art that it is not so limited but is susceptible of various changes and modifications without departing from the spirit and scope thereof.

We claim as our invention:

1. A display device comprising a plurality of light producing elements comprising electroluminescent phosphor material, means to excite said electroluminescent phosphor material to form a light image in a viewing plane, a plurality of nonlinear dielectric members having planar surfaces of appreciable area nonparallel to said viewing plane and extending a distance from said viewing plane large compared to the diameter of the projection of one of said light producing elements in said viewing plane, circuit elements disposed on said planar surfaces in a repetitive elemental pattern, said nonlinear dielectric members and said circuit elements comprising control structures for the control of the light output from each of said light producing elements.

2. A display device comprising a plurality of light producing elements comprising electroluminescent phosphor material, means to excite said electroluminescent phosphor material to form a light image in a viewing plane, each of said light producing elements having an elemental conductive electrode, each of said elemental conductive electrodes electrically connected to a control structure, said control structure comprising a nonlinear dielectric member having large surface area extending nonparrallel to said viewing plane, said nonlinear dielectric member having circuit elements disposed thereon such that said circuit elements and said nonlinear dielectric material cooperate to provide a structure for the control of light output from each of said light producing elements.

3. A display device comprising a plurality of light producing elements comprising electroluminescent phosphor material, means to excite said electroluminescent phosphor material to form a light image in a viewing plane, each of said light producing elements having an elemental conductive electrode, a plurality of nonlinear dielectric members each extending across only one row of said elemental conductive electrodes, said nonlinear dielectric members each having planar surfaces extending a distance from said viewing plane large compared to the diameter of the projection of one of said light producing elements in said viewing plane, circuit elements disposed on said planar surfaces in a repetitive elemental pattern, said nonlinear dielectric members and said circuit elements comprising control structures for the control of the light output from each of said light producing elements.

4. A display device comprising a layer of electroluminescent phosphor material having a front electrode and elemental back electrodes defining a plurality of light producing elements, a plurality of nonlinear dielectric members having appreciable surface area nonparallel to the plane of said electroluminescent layer, each of said nonlinear dielectric members having circuit elements disposed thereon such that said circuit elements and said nonlinear dielectric material cooperate to provide a structure for the control of light output from each of said light producing elements.

5. A display device comprising an electroluminescent cell of a plurality of individual light producing elements, each of said light producing elements having a conductive back electrode, each of said back electrodes electrically connected to a control structure, said control structure comprising a nonlinear dielectric member having large surface area extending nonparallel to said electroluminescent cell, said nonlinear dielectric member having disposed thereon conductive elements such that nonlinear dielectric control capacitors are formed to control the light output of said light producing element.

6. A display device comprising a layer of electroluminescent phosphor material, said electroluminescent layer having on one side thereof an electrically continuous front electrode and on the opposite side thereof a plurality of elemental back electrodes, a plurality of nonlinear dielectric members each extending across only one row of said back electrodes, said nonlinear dielectric members having thereon circuit elements in a repetitive elemental pattern, said nonlinear dielectric members and said circuit elements comprising a bridge circuit control configuration for the control of the light output from elemental areas of said electroluminescent cell.

7. A display device comprising a planar electroluminescent cell having a plurality of light producing elements, a plurality of nonlinear dielectric members disposed on the back surface of said electroluminescent cell, said nonlinear dielectric members each having planar surfaces of substantial area for the disposition of circuit elements thereon comprising a plurality of elemental structures for the control of the outputs of each of said light producing elements, said planar surfaces disposed nonparallel to said planar electroluminescent cell.

8. A display device comprising a planar electroluminescent cell having a plurality of light producing elements, a plurality of nonlinear dielectric members disposed on the back surface of said electroluminescent cell, said nonlinear dielectric members each having oppositely disposed planar surfaces for the disposition of circuit elements thereon comprising a plurality of elemental structures for the control of the outputs of each of said light producing elements, said planar surfaces disposed nonparallel to said planar electroluminescent cell and having a dimension extending from said electroluminescent cell considerably larger than a diameter of each of said light producing elements.

9. A display device comprising a planar electroluminescent cell having a plurality of light producing elements, a plurality of nonlinear dielectric members disposed on the back surface of said electroluminescent cell, said nonlinear dielectric members each having parallel planar surfaces for the disposition of circuit elements on both surfaces of said nonlinear dielectric members, said planar surfaces disposed nonparallel to said planar electroluminescent cell and having a dimension extending therefrom considerably larger than the diameter of each of said light producing elements of said electroluminescent cell, said nonlinear dielectric members having said circuit elements disposed thereon defining a plurality of elemental bridge circuit control structures for the control of the light output from each of said light producing elements.

10. A display device comprising a planar electroluminescent cell having a plurality of light producing elements, a plurality of nonlinear dielectric members disposed on the back surface of said electroluminescent cell in a mechanically unitary structure, said nonlinear dielectric members each having oppositely disposed planar surfaces, a pattern of conductive and resistive circuit elements disposed on said planar surfaces for the formation of a plurality of elemental bridge circuit control structures for the control of the light output of each of said light producing elements, said planar surfaces disposed nonparallel to said planar electroluminescent cell and having a dimension extending from said planar electroluminescent cell considerably greater than the diameter of each of said light producing elements.

11. A display device comprising an electroluminescent cell having a layer of electroluminescent phosphor material, said phosphor layer having on a first surface thereof a front electrode and on the opposing surface thereof a plurality of elemental back electrodes defining a plurality of light producing elements, a plurality of nonlinear dielectric members having surfaces of large area disposed nonparallel to the plane of said electroluminescent cell, each of said nonlinear dielectric members having disposed on a first surface thereof a plurality of control electrodes each of which is electrically coupled to a back electrode of said electroluminescent cell, the opposite surface of each of said nonlinear dielectric members having disposed thereon a pair of power input conductors, a pair of excitation potential sources each having a first terminal electrically coupled to said front electrode of said electroluminescent cell, said pair of excitation potential sources each having a second terminal electrically coupled to one of said pair of power input conductors, and means for applying control signals to each of said control electrodes to control the light output of each of said light producing elements.

12. A display device comprising an electroluminescent cell having a substantially planar layer of electroluminescent phosphor material, said phosphor layer having on a first surface thereof a front electrode and on the opposing surface thereof a plurality of elemental back electrodes defining a plurality of light producing elements, a plurality of nonlinear dielectric members having surfaces of large area disposed substantially perpendicular to the plane of said electroluminescent cell, each of said nonlinear dielectric members having disposed on a first surface thereof a plurality of control electrodes each of which is electrically coupled to a back electrode of said electroluminescent cell, the opposite surface of each of said nonlinear dielectric members having disposed thereon a pair of power input conductors, a pair of excitation potential sources each having a first terminal electrically coupled to said front electrode of said electroluminescent cell, said pair of excitation potential sources each having a second terminal electrically coupled to one of said pair of power input conductors, said nonlinear dielectric members being cooperatively associated with said control electrodes and said pair of power input conductors to form for each light producing element two nonlinear dielectric control capacitors having one of said control electrodes as a common plate electrically coupled in series circuit relationship to one of said light producing elements, and means to apply control signals to said control electrodes to modify the impedance of said nonlinear dielectric control capacitors to the output of said excitation potential sources to thereby control the light output of each of said light producing elements.

13. A display device comprising an electroluminescent cell having a layer of electroluminescent phosphor material, said phosphor layer having on a first surface thereof a front electrode and on the opposing surface thereof a plurality of elemental back electrodes defining a like plurality of light producing elements, a plurality of fin-like nonlinear dielectric members having surfaces of large area disposed nonparallel to the plane of said electroluminescent cell, each having said nonlinear dielectric members having disposed on a first surface thereof a plurality of control electrodes, each of which is electrically coupled in series circuit relationship to a resistive element, a second conductive element and a back electrode of said electroluminescent cell, the opposite surface of each of said nonlinear dielectric members having disposed thereon a pair of power input conductors opposite said control electrodes and a conductive strip opposite said second conductive elements, a pair of excitation potential sources each having a first terminal electrically coupled to said front electrode of said electroluminescent cell, said pair of excitation potential sources each having a second terminal electrically coupled to one of said pair of power input conductors, each of said nonlinear dielectric members being cooperatively associated with said control electrodes and said pair of power input conductors to form for each light producing element two nonlinear dielectric control capacitors having one of said control electrodes as a common plate electrically coupled in series circuit relationship to one of said light producing elements, each of said nonlinear dielectric members being cooperatively associated with said second conductive elements and said conductive strip to form for each light producing element a coupling capacitor electrically coupled in series circuit relationship to one of said control electrodes and separated therefrom by said resistive element, and means to apply control signals to said control electrodes to modify the impedance of said nonlinear dielectric control capacitors to the output of said excitation potential sources to thereby control the light output of each of said light producing elements.

14. A display device comprising an electroluminescent cell having a layer of electroluminescent phosphor material, said phosphor layer having on a first surface thereof a front electrode and on the opposing surface thereof a plurality of elemental back electrodes difining a plurality of light producing elements, a plurality of nonlinear dielectric members having surfaces of large area disposed nonparallel to the plane of said electroluminescent cell, said surfaces extending a distance from said electroluminescent cell large compared to the diameter of one of said light producing elements, means for mechanically securing a plurality of said nonlinear dielectric members into a unitary structure, each of said nonlinear dielectric members having disposed on a first surface thereof a plurality of control electrodes each of which is electrically coupled to a back electrode of said electroluminescent cell, the opposition surface of each of said nonlinear dielectric members having disposed thereon a pair of power input conductors, a pair of excitation potential sources each having a first terminal electrically coupled to said front electrode of said electroluminescent cell, said pair of excitation potential sources each having a second terminal electrically coupled to a different one of said pair of power input conductors, said nonlinear dielectric members being cooperatively associated with said control electrodes, said pair of power input conductors, and said pair of excitation potential sources to form for each light producing element two nonlinear dielectric control capacitors in a bridge circuit control configuration having said electroluminescent cell in its center branch, and means to apply control signals to said control electrodes to control the light output of each of said light producing elements.

15. A display device comprising an electroluminescent cell having a substantially planar layer of electroluminescent phosphor material, said phosphor layer having on a first surface thereof a front electrode and on the opposing surface thereof a plurality of elemental back electrodes defining a plurality of light producing elements, a plurality of nonlinear dielectric members having surfaces of large area disposed substantially perpendicular to the plane of said electroluminescent cell, said surfaces extending a distance from said electroluminescent cell of about five or more times greater than the diameter of one of said light producing elements, means for mechanically securing a plurality of said nonlinear dielectric members in a unitary structure, each of said nonlinear dielectric members having disposed on a first surface thereof a plurality of control electrodes each of which is electrically coupled to a back electrode of said electroluminescent cell, the opposite surface of each of said nonlinear dielectric members having disposed thereon a pair of power input conductors, a pair of excitation potential sources each having a first terminal electrically coupled to said front electrode of said electroluminescent cell, said pair of excitation potential sources each having a second terminal electrically coupled to a different one of said pair of power input conductors, said nonlinear dielectric members being cooperatively associated with said control electrodes and said pair of power input conductors to form for each light producing element two nonlinear dielectric capacitors in a bridge circuit control configuration wherein said electroluminescent cell is in the center branch, and means to apply control signals to said control electrodes to modify the impedance of said nonlinear dielectric control capacitors to the output of said excitation potential sources to thereby control the light output of each of said light producing elements.

16. A display device comprising an electroluminescent cell having a layer of electroluminescent phosphor material, said phosphor layer having on a first surface thereof a front electrode and on the opposing surface thereof a plurality of elemental back electrodes defining a like plurality of light producing elements, a plurality of fin-like nonlinear dielectric members having surfaces of large area disposed nonparallel to the plane of said electroluminescent cell, said surfaces extending from said electroluminescent cell, said surfaces extending from said electroluminescent cell a distance of about five or more times greater than the diameter of one of said light producing elements, means for mechanically securing a plurality of said nonlinear dielectric members into a unitary structure, each of said nonlinear dielectric members having disposed on a first surface thereof a plurality of control electrodes, resistive elements and second conductive elements, each of said control electrodes being electrically coupled in series circuit relationship to one of said resistive elements, one of said second conductive elements and one of said back electrodes of said electroluminescent cell, the opposite surface of each of said nonlinear dielectric members having disposed thereon a pair of power input conductors opposite said control electrodes and a conductive strip opposite said second conductive elements, a pair of excitation potential sources each having a first terminal electrically coupled to said front electrode of said electroluminescent cell, said pair of excitation potential sources each having a second terminal electrically coupled to a different one of said pair of power input conductors, each of said nonlinear dielectric members being cooperatively associated with said control electrodes, said pair of power input conductors and said pair of excitation potential sources to form for each light producing element two nonlinear dielectric capacitors in a bridge circuit control configuration wherein said light producing elements is in the center branch, each of said nonlinear dielectric members being cooperatively associated with said second conductive elements and said conductive strip to form for each light producing element a coupling capacitor electrically coupled in series circuit relationship to one of said control electrodes and separated therefrom by said resistive element, and means to apply control signals to said control electrodes to modify the impedance of said nonlinear dielectric control capacitors to the output of said excitation potential sources to thereby control the light output of each of said light producing elements.

References Cited in the file of this patent

UNITED STATES PATENTS 2,922,076     Sack et al. _____ Jan. 19, 1960